US012584533B2

(12) United States Patent
Noe

(10) Patent No.: US 12,584,533 B2
(45) Date of Patent: Mar. 24, 2026

(54) BORING BAR WITH ELECTRODYNAMIC ACTUATORS FOR COUNTERACTING VIBRATIONS AND MACHINE TOOL PROVIDED WITH SUCH A BAR

(71) Applicant: HUTCHINSON, Paris (FR)

(72) Inventor: Mathieu Noe, Ballancourt (FR)

(73) Assignee: HUTCHINSON, Paris (FR)

( * ) Notice: Subject to any disclaimer, the term of this patent is extended or adjusted under 35 U.S.C. 154(b) by 734 days.

(21) Appl. No.: 17/997,922

(22) PCT Filed: May 6, 2021

(86) PCT No.: PCT/EP2021/061965
§ 371 (c)(1),
(2) Date: Nov. 3, 2022

(87) PCT Pub. No.: WO2021/224378
PCT Pub. Date: Nov. 11, 2021

(65) Prior Publication Data
US 2023/0182213 A1 Jun. 15, 2023

(30) Foreign Application Priority Data
May 7, 2020 (FR) ...................................... 2004538

(51) Int. Cl.
*B23B 29/02* (2006.01)
*F16F 7/10* (2006.01)

(52) U.S. Cl.
CPC .......... *F16F 7/1011* (2013.01); *B23B 29/022* (2013.01)

(58) Field of Classification Search
CPC .... B23B 27/002; B23B 29/022; F16F 7/1005; F16F 7/1011; F16F 15/03; F16F 15/18
See application file for complete search history.

(56) References Cited

U.S. PATENT DOCUMENTS 3,961,857 A * 6/1976 Koblesky .......... B23B 29/03457
279/6
5,170,103 A * 12/1992 Rouch ................... F16F 15/005
318/128
(Continued)

FOREIGN PATENT DOCUMENTS

CN 107989958 A 5/2018
CN 108927538 A 12/2018
(Continued)

OTHER PUBLICATIONS

International Search Report for PCT/EP2021/061965 (Jun. 30, 2021).

*Primary Examiner* — Bradley T King
(74) *Attorney, Agent, or Firm* — Merchant & Gould, P.C.

(57) ABSTRACT

A boring bar with electrodynamic actuators is for counteracting vibrations and machine tool provided with such a bar. The boring bar includes a wall, an internal recess and a longitudinal axis. The boring bar has a first electrodynamic actuator with coil windings associated with a moving mass and a spring assembly that are arranged to define a first actuation direction perpendicular to the longitudinal axis of the boring bar. A second electrodynamic actuator has coil windings associated with a moving mass and a spring assembly that are arranged to define a second actuation direction perpendicular to both the first actuation direction and the longitudinal axis of the boring bar. The actuators allow counteraction of the vibrations in the directions perpendicular to the longitudinal axis of the bar. The longitudinal axis also defines the boring direction.

15 Claims, 7 Drawing Sheets

(56) References Cited

U.S. PATENT DOCUMENTS

| | | | | |
|---|---|---|---|---|
| 5,558,477 | A | | 9/1996 | Browning |
| 5,816,122 | A | * | 10/1998 | Benning ................ F16F 15/02 408/11 |
| 5,913,955 | A | * | 6/1999 | Redmond ............ B23B 29/022 409/141 |
| 6,009,985 | A | * | 1/2000 | Ivers ....................... F16F 7/104 244/54 |
| 6,443,673 | B1 | * | 9/2002 | Etling .................... F16F 15/10 409/141 |
| 7,272,877 | B2 | * | 9/2007 | Cardemon ........ B23B 29/03403 82/158 |
| 7,591,209 | B2 | * | 9/2009 | Murakami ........... B23B 29/022 82/158 |
| 10,500,648 | B1 | * | 12/2019 | Saffouri ............... B23B 29/022 |
| 2002/0083805 | A1 | * | 7/2002 | Lundblad ............ F16F 15/005 82/163 |
| 2004/0240955 | A1 | | 12/2004 | Lundblad |
| 2006/0291973 | A1 | * | 12/2006 | Claesson ............... B23Q 17/12 409/141 |
| 2007/0089574 | A1 | * | 4/2007 | Murakami ........... B23B 29/022 82/158 |
| 2008/0292418 | A1 | * | 11/2008 | Kay ....................... B23B 29/12 428/689 |
| 2009/0202313 | A1 | * | 8/2009 | Komai ................. B23B 29/022 408/143 |
| 2016/0377140 | A1 | * | 12/2016 | Frota De Souza Filho ................ B22F 5/106 264/261 |
| 2018/0154453 | A1 | * | 6/2018 | Eichelberger ......... B23B 27/002 |
| 2023/0219142 | A1 | * | 7/2023 | Groll .................... B23B 27/002 408/199 |
| 2023/0330752 | A1 | * | 10/2023 | Groll .................... B23B 27/002 |

FOREIGN PATENT DOCUMENTS

| | | | |
|---|---|---|---|
| EP | 0585400 | A1 | 3/1994 |
| JP | 2007-111619 | A | 5/2007 |

* cited by examiner

X (tangentiel)

Y (radial)

Z (axial)

X

⊗Y

Z

P          BF          LI

Z 200        100

Fig. 8
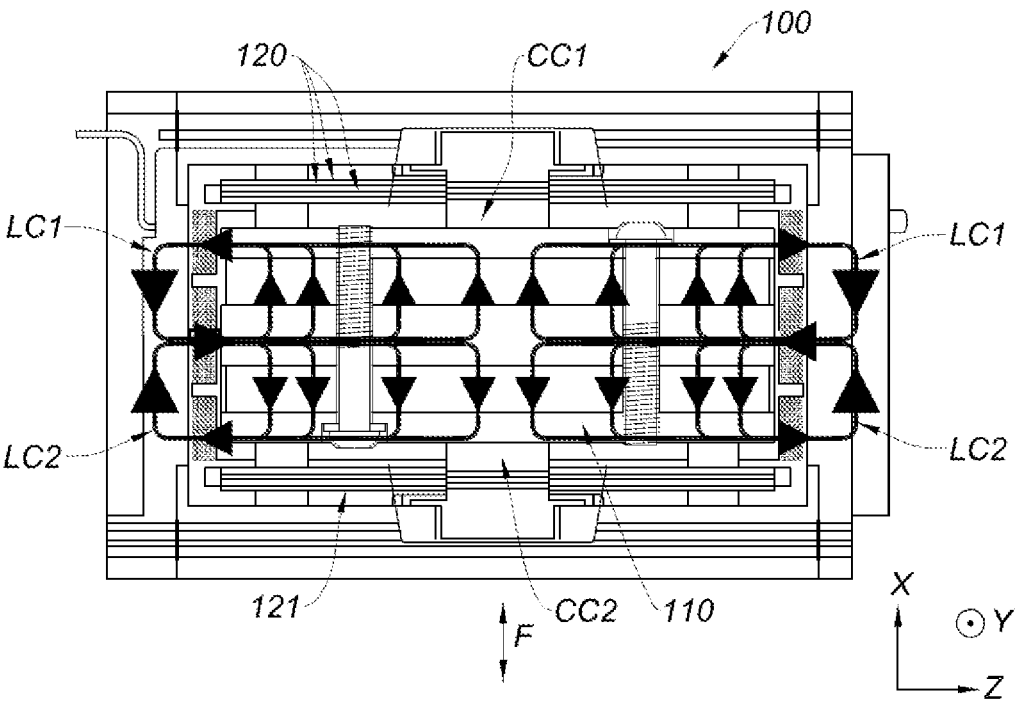
Fig. 9
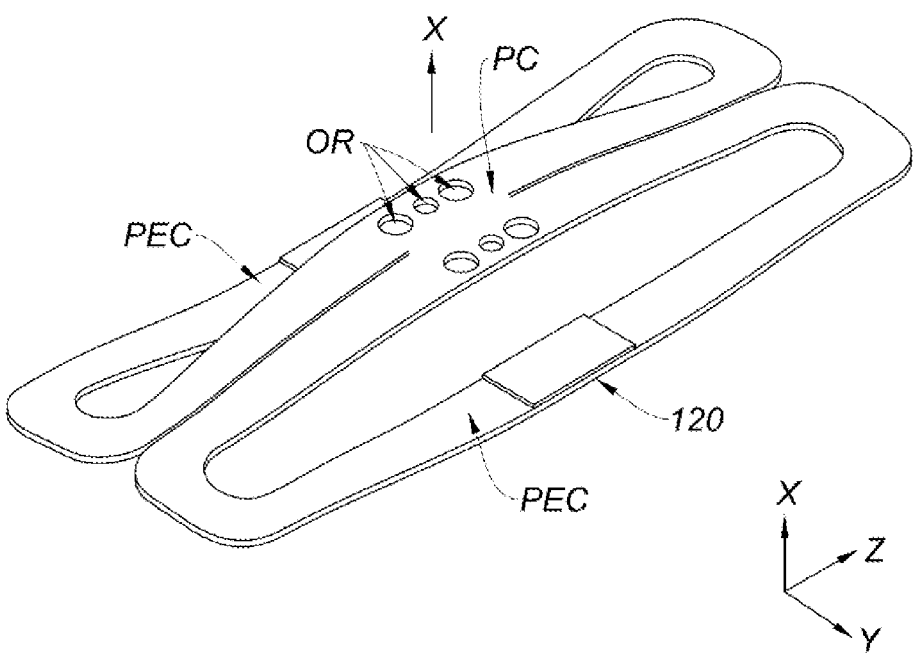
Fig. 10

BORING BAR WITH ELECTRODYNAMIC ACTUATORS FOR COUNTERACTING VIBRATIONS AND MACHINE TOOL PROVIDED WITH SUCH A BAR

This application is a National Stage Application of PCT/EP2021/061965, filed May 6, 2021, which claims benefit of Patent Application No. 2004538, filed May 7, 2020 in France, and which applications are incorporated herein by reference. To the extent appropriate, a claim of priority is made to each of the above-disclosed applications.

TECHNICAL FIELD OF THE INVENTION

The present invention relates to the field of boring bars as well as to that of machine tools comprising such a bar.

TECHNICAL BACKGROUND

In order to machine a workpiece, a machine tool often uses a boring bar to make a bore in a workpiece.

In use, the boring bar is caused to move along its longitudinal axis to machine the workpiece. The boring bar is only held in a cantilevered position on the machine tool by one end, with the other end, which is intended to be brought into contact with the workpiece, forming a free end. When machining a workpiece, the free end of the boring bar in contact with the workpiece oscillates in the plane perpendicular to its longitudinal axis.

To avoid or at least limit these vibrations, which are harmful to the quality and stability of the machining, there are already many solutions, both passive and active.

Among the passive solutions, there is the dynamic beater, which consists of a mass-spring type solution whose natural frequency is tuned to the resonance frequency of the bending mode of the boring bar in order to counteract the vibrations of the free end of the boring bar. There are also solutions where a floating mass is placed in a viscous fluid to dampen the movement of the free end of the boring bar.

The active solutions consist in providing sensors (e.g. accelerometers) to measure the vibrations experienced by the boring bar, the sensors being associated with actuators and a data processing and control unit (processor) receiving, as input, the data from the sensors and issuing, as output, commands for the actuators.

The actuators can then counteract the vibrations experienced by the boring bar on the basis of the data measured by the sensors.

In particular, the active approach broadens the range of bending mode vibration frequencies of the boring bar that can be countered.

Different types of actuators are used to implement active solutions.

Very often, the actuator is a piezoelectric actuator with an associated moving mass. The displacement of the moving mass, at the appropriate frequency, can then counteract the vibrations experienced by the free end of the boring bar. Reference may be made, for example, to the document U.S. Pat. No. 5,558,477.

However, the piezoelectric actuators cannot generate very large displacements of the moving mass (the maximum deformation rate of a piezoelectric ceramic generally does not exceed 0.1%) and can only generate sufficient counter-vibrations to dampen those of the free end of the boring bar when the boring bar is vibrating at relatively high frequencies, which is typically the case for smaller diameter bars, which are also shorter.

This is because the force F generated by a moving mass is proportional to the product of its mass M and the acceleration A it undergoes (Newton). For a given moving mass, for example a vibrating beam of a given length, embedded on one side and free on the other, the acceleration A undergone corresponds to the product of its displacement d (on its free side) under the effect of the piezoelectric, by the pulsation squared, $\omega^2$. And this pulsation is directionally proportional to the frequency f, according to the relation $\omega=2.\pi.f$. Thus, if the bar vibrates at a relatively high frequency, a piezoelectric actuator, although generating limited displacements, can generate sufficient forces to counteract the vibrations.

This is much more difficult for a bar vibrating at low frequencies, typically a long bar with a larger diameter.

Of course, to compensate for this, one can provide piezoelectric actuators that generate larger displacements, which simply means more powerful, and therefore larger, piezoelectric actuators. In practice, this solution is unsuitable for some boring bars, which define a constrained internal volume, unless this is installed outside the boring bar, which is generally not desired.

More recently, it has been proposed to use an electromagnetic actuator, again in conjunction with a moving mass. For example, reference can be made to the document CN108927538 A.

In this approach, an actuator comprises four electromagnets distributed at regular intervals along the inner circumference of the boring bar. The electromagnets can thus be operated in pairs (electromagnets that are diametrically opposed), under the influence of an electronic control module, which then allows the displacement of the moving mass, located radially internal with respect to the electromagnets.

The direction of movement of the moving mass (soft iron type), radially internal with respect to the electromagnets, can thus be controlled in a direction contained in the plane perpendicular to the longitudinal axis of the boring bar.

Furthermore, with an electromagnetic actuator, it is possible to generate relatively large forces, even in a small space, for example that defined by the internal volume of a boring bar. Indeed, with an electromagnetic actuator, the force generated is inversely proportional to the square of the air gap between the electromagnet and the moving mass. Thus, in contrast to the piezoelectric actuator, it is possible to generate high forces even when the boring bar is operated at relatively low frequencies.

However, the non-linear behaviour of this type of actuator requires a much more difficult control than with a piezoelectric actuator.

This non-linearity can certainly be moderated by limiting the possible displacement of the moving mass to finally have a quasi-linear behaviour, but this is then done at the expense of the force likely to be generated by the electromagnetic actuator, at the risk of seeing its behaviour at low frequencies less well adapted to counter, at such low frequencies, vibrations of the free end of the boring bar.

On the contrary, when this non-linear behaviour is fully accepted, it is then necessary to prevent the air gap from becoming too small in operation, or even zero, which is detrimental to the life of the actuator. Therefore, a large air gap (which is defined in the radial direction of the actuator) is often considered in the design. This then limits the applicability to space constrained environments, such as the internal volume of a boring bar. To compensate for this, it is possible to increase the current flowing through the individual coils as the force generated is proportional to this current squared, but this is at the expense of greater energy expenditure.

SUMMARY OF THE INVENTION

An objective of the invention is to provide a solution that does not have at least one of the above-mentioned disadvantages.

In particular, an objective of the invention is to be able to provide a boring bar provided with at least one actuator capable of generating high forces, for example to be able to counteract low frequency vibrations, particularly well suited to the constrained environment of a boring bar and easy to control.

To this end, the invention proposes a boring bar provided with a wall, an internal recess and a longitudinal axis, said boring bar comprising, in its internal recess:—a first electrodynamic actuator comprising coil windings surrounding a moving mass provided with at least one permanent magnet as well as, on either side of the moving mass, at least one spring mounted on the moving mass, the assembly being arranged to define a first direction of actuation perpendicular to the longitudinal axis of the boring bar;—a second electrodynamic actuator provided with coil windings surrounding a moving mass provided with at least one permanent magnet as well as, on either side of the moving mass, at least one spring mounted on the moving mass, the assembly being arranged so as to define a second direction of actuation which is both perpendicular to the first direction of actuation and to the longitudinal axis of the boring bar.

The boring bar according to the invention may comprise at least one of the following features, taken alone or in combination:

the first electrodynamic actuator and the second electrodynamic actuator are located one after the other along the longitudinal axis of the boring bar;

the first electrodynamic actuator comprises a first coil winding and a second coil winding located opposite the first coil winding in a first direction perpendicular to the longitudinal axis of the boring bar, said at least one permanent magnet being arranged between two layers made of a soft magnetic material;

the first actuator comprises a third coil winding, located opposite the second coil winding along said first direction, and in that the moving mass is provided with a second permanent magnet arranged between two layers made of a soft magnetic material;

the second electrodynamic actuator comprises a first coil winding and a second coil winding located opposite the first coil winding, according to a second direction both perpendicular to said first direction and to the longitudinal axis of the boring bar, said at least one permanent magnet being arranged between two layers made of a soft magnetic material;

the second actuator comprises a third coil winding located opposite the second coil winding in said second direction, and in that the moving mass is provided with a second permanent magnet arranged between two layers made of a soft magnetic material;

the moving mass and thus each coil winding has larger dimensions along the longitudinal axis of the boring bar than in the plane perpendicular to said longitudinal axis;

the or each electrodynamic actuator comprises, on either side of the moving mass, a plurality of springs juxtaposed in the direction of actuation of the actuator in question;

the or each actuator comprises pads inserted in the springs;

the wall comprises, at the level of the or each actuator, at least two removable covers, substantially diametrically opposed, arranged opposite one of the springs mounted on the moving mass;

the wall is provided with a plurality of orifices extending in the direction defined by the longitudinal axis of the boring bar;

the actuator located closest to a cutting tool of the boring bar has a direction of actuation coinciding with a radial direction of vibration of the cutting tool;

the cumulative length, defined along said longitudinal axis of the boring bar, of the first actuator and the second actuator does not exceed 30% of the total length of the boring bar.

The invention also relates to a machine tool comprising:—a boring bar according to the invention, said boring bar further comprising, in its inner recess, at least one vibration sensor able to sense vibrations in a plane perpendicular to the longitudinal axis of the boring bar,-at least one processor configured to receive the data from said at least one vibration sensor, to process them and to control the first actuator and the second actuator based on the data thus processed.

The boring bar of said machine tool may further comprise, in its inner recess: a first vibration sensor configured and arranged, within the boring bar, to detect vibrations in said first direction; and a second vibration sensor configured and arranged, within the boring bar, to detect vibrations in said second direction.

BRIEF DESCRIPTION OF THE FIGURES

Further features and advantages of the invention will become apparent in the course of the following detailed description, for the understanding of which reference is made to the annexed drawings, for which the following is provided

FIG. 8 shows, in the cross-sectional view of FIG. 4, the magnetic field lines within the electrodynamic actuator when it is in operation;

FIG. 9 is a perspective view of a spring employed in the electrodynamic actuator shown in FIG. 4, when the latter is in operation;

5

Figure 11:
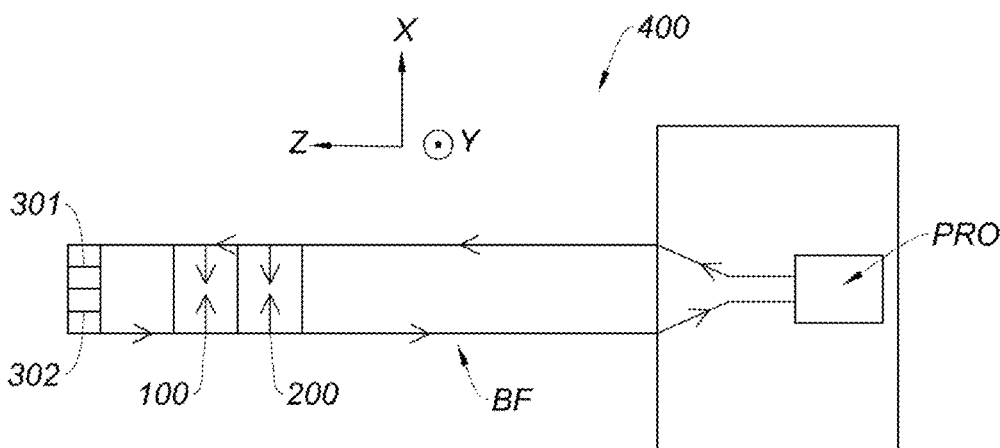

FIG. 11 is a schematic diagram of a control-command system employed in a machine tool comprising the boring bar according to the invention.

DETAILED DESCRIPTION OF THE INVENTION

In the following description, X, Y and Z refer to three axes which are orthogonal to each other.

Figure 1:
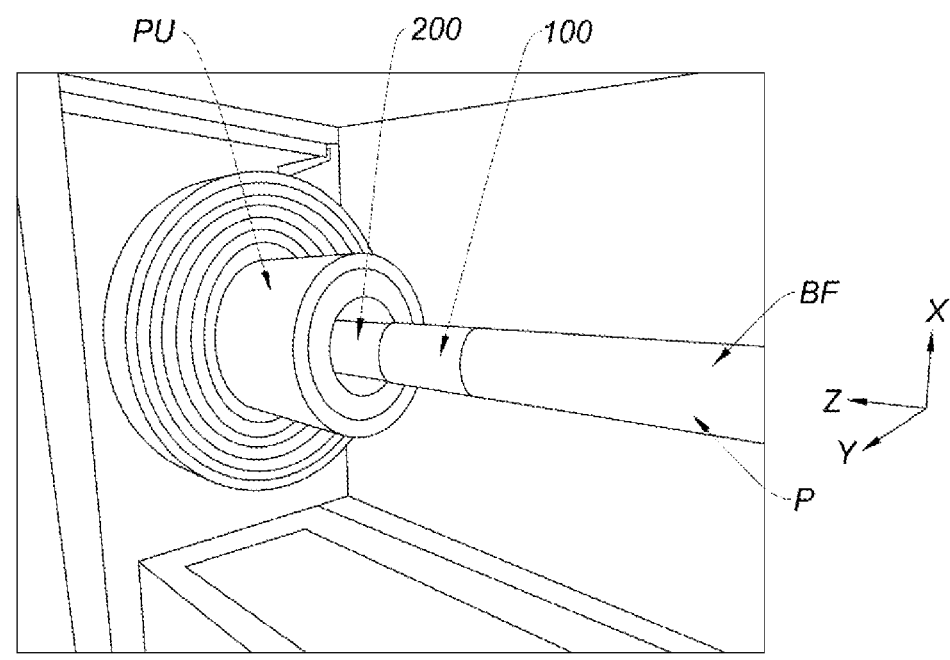
FIG. 1 shows a boring bar in accordance with the invention during the machining of a workpiece.

FIG. 1 shows a boring bar BF being machined on a workpiece PU. The boring bar BF is stationary and the workpiece PU is rotating. At the free end of the boring bar BF, which is mounted in the workpiece PU, there is a cutting tool OC, which is shown in FIG. 2 and at the tip of which the X, Y and Z axes have been represented.

On this boring bar BF, there are two actuators 100, 200, integrated into the boring bar BF. It is noted that the first actuator 100 and the second actuator 200 are located one after the other along the longitudinal axis Z of the boring bar BF.

Figures 2, 3:
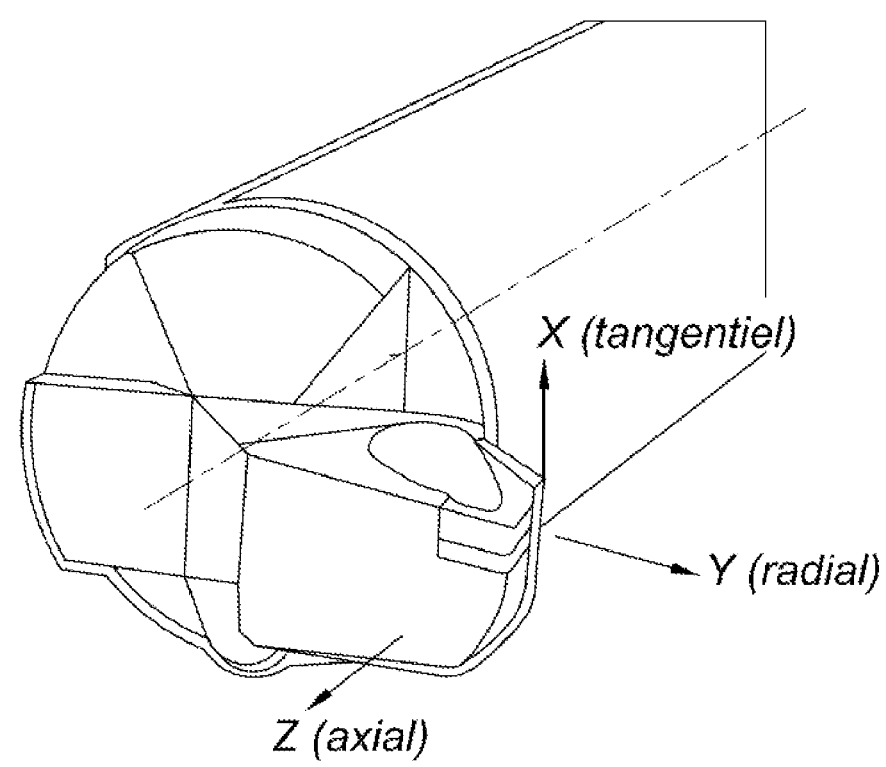
FIG. 2 shows the boring bar of FIG. 1 before machining, at its end where the cutting tool is located.
FIG. 3 is a schematic view of the bar of FIG. 1, taken in cross-section at the level of actuators employed in said bar.

FIG. 3 shows a longitudinal sectional view of the boring bar BF of FIG. 1.

The boring bar BF has a wall P, an internal recess LI and a longitudinal axis Z.

The boring bar BF comprises, in its internal recess LI, a first electrodynamic actuator 100 provided with coil windings 101, 102 associated with a moving mass 110 within which at least one permanent magnet is provided on either side of which at least one spring 120, 121 is mounted. All these components, namely the coil windings 101, 102, the moving mass 110 and the springs 120, 121 are arranged to define a first direction of actuation X perpendicular to the longitudinal axis Z of the boring bar BF.

An electrodynamic actuator allows to generate much greater forces than those that are likely to be generated with a piezoelectric actuator, on the other hand, without having the disadvantages of an electromagnetic actuator since the behaviour of an electrodynamic actuator is linear (the Laplace force F=BLI depends only on terms of order 1, with B, the magnetic field in the air gap, L, the length of a coil winding, and I, the intensity of the current passing through the coil winding). Furthermore, the value of the air gap is not affected by the movement of the moving mass.

This electrodynamic actuator 100 is described in more detail below with reference to FIGS. 4 to 7.

The first electrodynamic actuator 100 comprises a first coil winding 101 and a second coil winding 102 located opposite, in the first direction X perpendicular to the longitudinal axis Z of the boring bar, the first coil winding 101.

The first electrodynamic actuator 100 also comprises a moving mass 110 provided with at least one permanent magnet 111 arranged between two layers 113, 115 of a soft magnetic material. The moving mass 110 is further surrounded by the first coil winding 101 and by the second coil winding 102 so as to define an air gap E, between the coil windings 101, 102 and said at least one permanent magnet 111, defined in a plane perpendicular to said first direction X.

The first electrodynamic actuator 100 also comprises at least two springs 120, 121 mounted on the moving mass 110, each of said at least two springs being mounted on either side of the moving mass 100 along said first direction X. It is advantageous to provide a spring 120, 121 on either side of the moving mass because the moving mass is caused to move in the direction defined by the axis, but in either direction along that axis.

A spring 120, 121 may have different types of shape. However, it is advantageous that its shape should imply a greater rigidity in the two directions perpendicular to the direction of actuation of the actuator 100. This ensures that the moving mass is guided along the direction of actuation. FIG. 9 also shows how the spring 120, 121 shown in FIGS. 4 to 7 deforms, along the first direction X, when it is loaded by the moving mass 110. In this case, the spring 120, 121 is in the form of a flat leaf, and more particularly a flat leaf in the shape of a "flattened figure eight" in the direction Y. The orifices OR allow mounting, by bolts or equivalent suitable means, on a central column CC1, CC2 of the moving mass 110 while the central external parts of the spring 120, 121 are fixedly mounted on a fixed part of the electrodynamic actuator 100. As a result, it is a central part PC of the spring 120, 121 that is caused to deform under the action of the moving mass 110.

It is understood that the first actuator 100 thus has a direction of actuation defined by said first direction X along which vibration damping can be provided. The arrow F represents the direction of actuation of the first actuator 100.

In FIG. 8, in particular, the field lines LC1 generated by the permanent magnets 111, 112 provided in the moving mass of the electrodynamic actuator shown in FIGS. 4 to 7 have been shown. The permanent magnet 111 has a magnetisation (North-South) which is along the first direction X. The same is true for the permanent magnet 112, but in the opposite direction. As can be seen in FIG. 8 (longitudinal section in the XZ plane), the part of these field lines passing through the air gap E is oriented in the direction Z.

Figure 4:
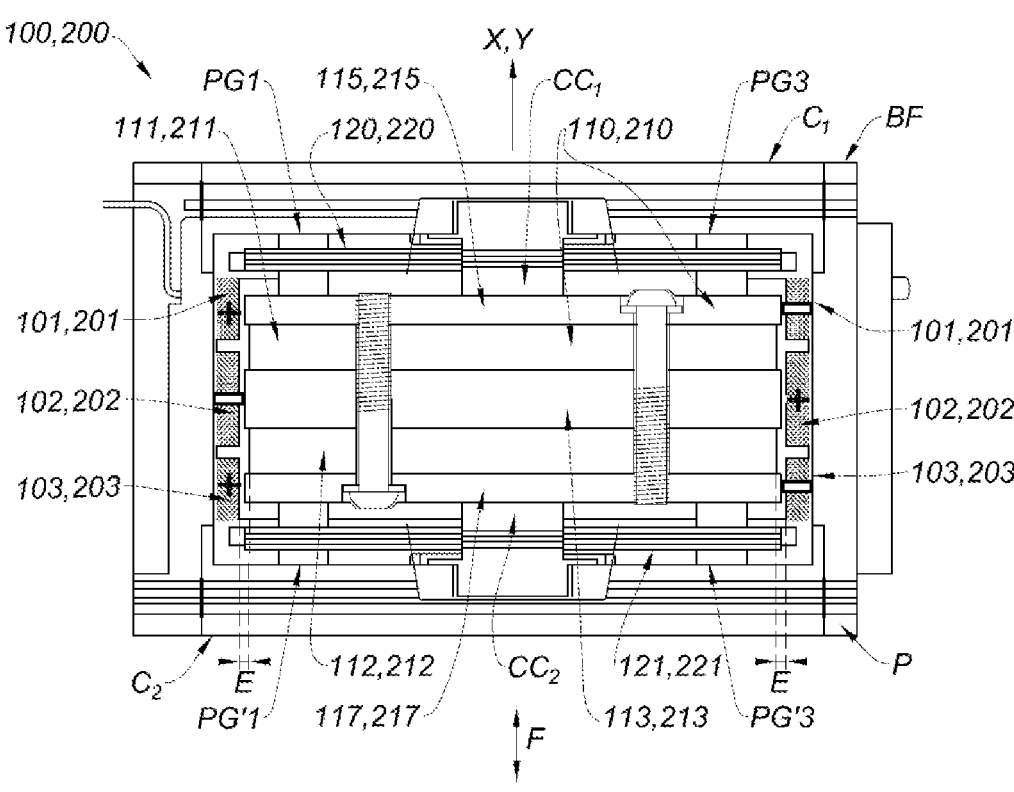
FIG. 4 is a longitudinal sectional view of an electrodynamic actuator employed in said bar.
Figure 5:
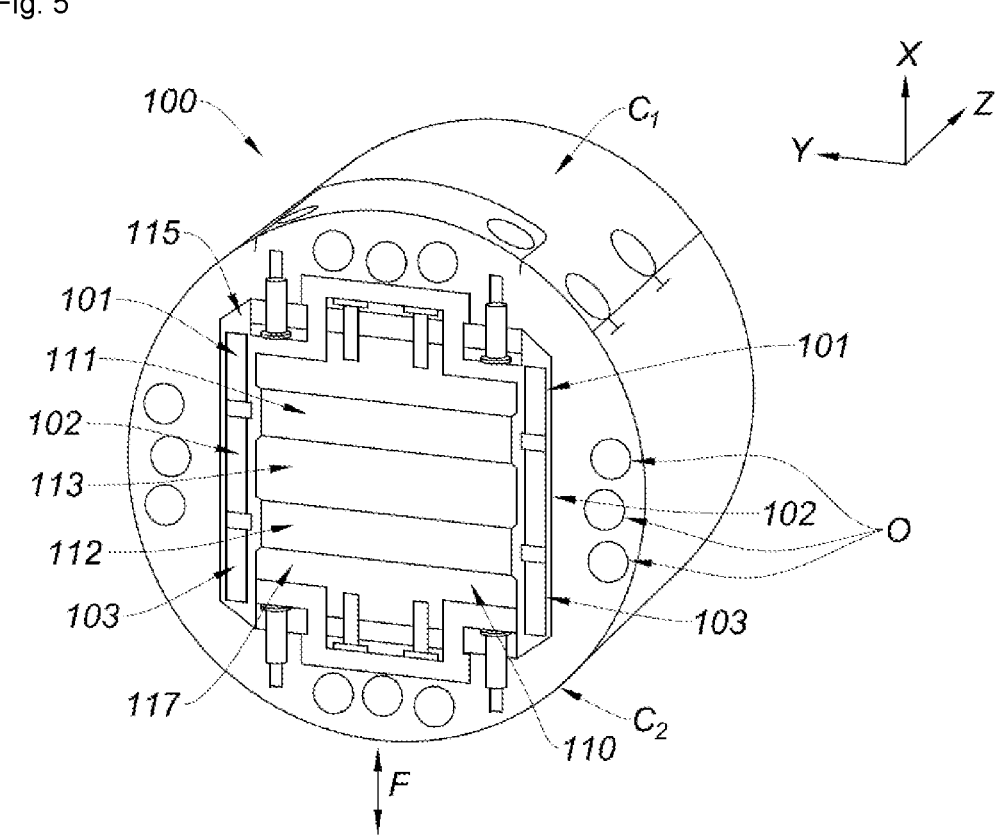
FIG. 5 is a perspective cross-sectional view of the electrodynamic actuator of FIG. 4.
Figure 6:
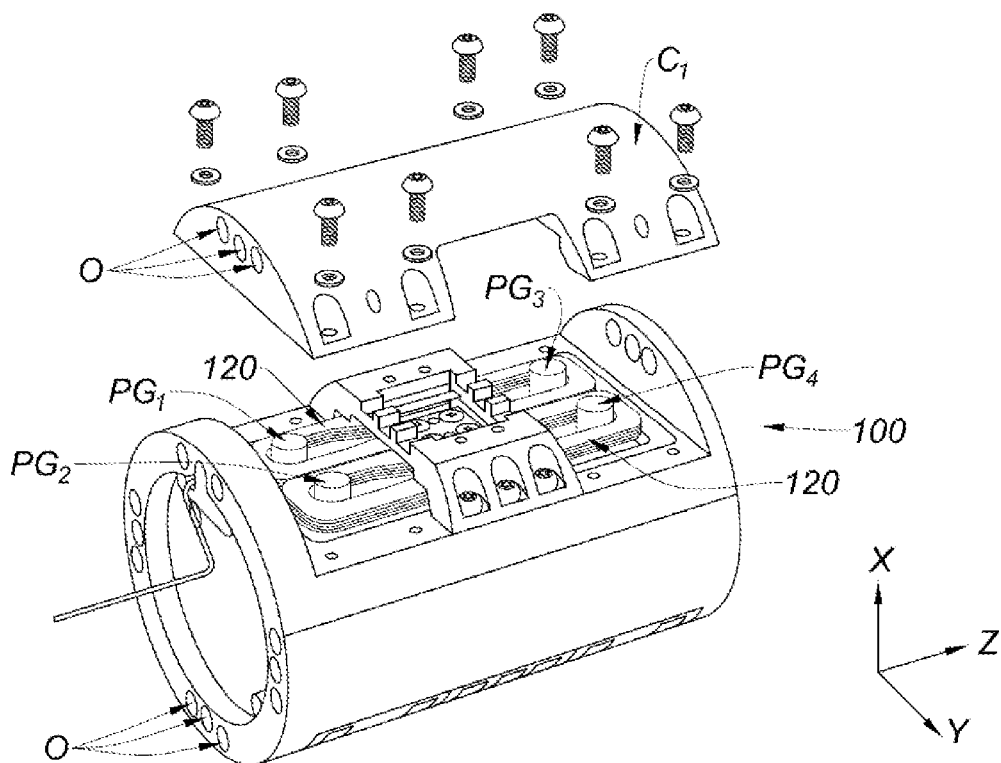
FIG. 6 is a perspective view of the electrodynamic actuator of FIG. 4, partially mounted.
Figure 7:
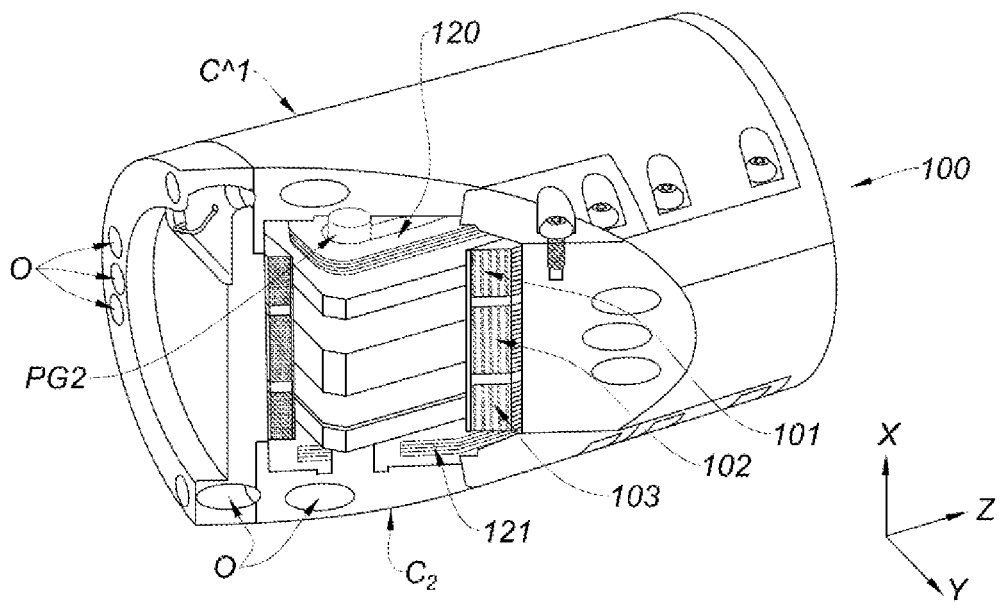
FIG. 7 is a perspective view and partial cross-section of the electrodynamic actuator of FIG. 4.

When the current is circulated with the power supply diagram for coils 101, 102 provided in FIG. 4 (also a longitudinal section in the plane XZ), it can be seen that the current is oriented along the axis Y in the coils 101, 102 located opposite each other and furthermore, with the signs "+" and "−", that the current is injected in opposite directions in the two coils 101, 102. As the magnetic field lines are oriented along the axis Z in the air gap E, a Laplace force F is then generated along the direction X. A similar reasoning could be held if one reasoned in the cross-sectional plane YZ, with a magnetic field then oriented along Y in the air gap and a current flowing along the axis Z in the coils 101, 102, to generate a Laplace force nevertheless still oriented along the axis X.

In FIG. 8, the axis X therefore defines the direction of actuation of the actuator.

The boring bar BF further comprises, in its internal recess LI, a second electrodynamic actuator 200 provided with coil windings 201, 202 associated with a moving mass 210 on either side of which is mounted at least one spring 220, 221. All these components, namely the coil windings 201, 202, the moving mass 210 and the springs 220, 221 are arranged to define a second direction of actuation Y both perpendicular to the first direction of actuation X and to the longitudinal axis Z of the boring bar BF.

The second electrodynamic actuator 200 is advantageously identical to the first electrodynamic actuator 100. However, the second electrodynamic actuator 200 is oriented differently from the first electrodynamic actuator 100 in order to counteract vibrations in the direction Y.

Therefore, the design shown in FIGS. 4 to 7 also describes the second electrodynamic actuator 200. For the sake of readability, however, we have only referenced the individual components of the second electrodynamic actuator 200 in FIG. 4.

Thus, the second electrodynamic actuator 200 comprises a first coil winding 201, as well as a second coil winding 202 located opposite, along the second direction Y both perpendicular to said first direction X and to the longitudinal axis Z of the boring bar, the first coil winding 201.

The second actuator 200 also comprises a moving mass 210 provided with at least one permanent magnet 211 arranged between two layers 213, 215 of a soft magnetic material. The moving mass 210 is surrounded by the first coil winding 201 and by the second coil winding 202 so as to define an air gap E, between the coil windings 201, 202 and said at least one permanent magnet 211, defined in a plane perpendicular to said second direction Y.

The second actuator 200 further comprises at least two springs 220, 221 mounted on the moving mass 210, each of said at least two springs being mounted on either side of the moving mass 210 along said second direction Y. As already indicated above for the first actuator 100, it is advantageous to provide a spring 220, 221 on either side of the moving mass because the moving mass is caused to move along the direction defined by the axis, but in either direction along that axis. More generally, all that has been said previously about the properties of the spring for the first actuator 100, in particular, in relation to FIG. 9 is applicable here.

It is therefore understood that the second actuator 200 has a direction of actuation defined by said second direction Y along which vibration damping can be provided. The arrow F represents the direction of actuation of the second actuator 100, namely here the second direction Y, which corresponds to the direction of movement of the moving mass 210.

The comments made earlier in support of FIG. 8 are applicable here.

From the preceding comments, it is incidentally understood that each of the actuators 100, 200 is dedicated, in operation, to the treatment of the vibrations generated by the free end EL of the boring bar BF according to a single direction X or Y, which are orthogonal, which finally allows to treat the vibrations in the whole plane perpendicular to the longitudinal axis Z of the boring bar BF.

Advantageously, the first electrodynamic actuator 100 comprises a third coil winding 103, located opposite the second coil winding 102 along said first direction X. Furthermore, advantageously, the moving mass 110 is provided with a second permanent magnet 112 arranged between two layers 113, 117 of a soft magnetic material. More precisely, the layer 113 of soft magnetic material is in contact with each permanent magnet 111, 112. It should be noted that the electrodynamic actuator 100 may well function correctly without a third coil winding and without a second permanent magnet. However, providing multiple permanent magnets, each of which is thin and surrounded on both sides by a soft magnetic material, improves the efficiency of the electrodynamic actuator. The field lines generated in the electrodynamic actuator 100, in operation, with this third coil 103 and this second permanent magnet 112, coil 103 in which the current flows in the same direction as in the first coil 101, are the field lines LC2.

Also advantageously, the second actuator 200 comprises a third coil winding 203 located opposite the second coil winding 202 along said second direction Y. Advantageously, the moving mass 201 is provided with a second permanent magnet 212 arranged between two layers 213, 217 of soft magnetic material. More precisely, the layer 213 of soft magnetic material is in contact with each permanent magnet 211, 212. The advantages and effects of this design have been described above.

The moving mass 110, 210 of each actuator 100, 200 (and consequently the coil windings surrounding it) has larger dimensions along the longitudinal axis Z of the boring bar BF than in the plane XY perpendicular to said longitudinal axis Z. Consequently, this is also the case for the coil windings 101 to 103 and 201 to 203, the length L of which can therefore be increased—without multiplying the number of turns around the moving mass. This greater longitudinal dimension allows to generate more forces than would have been possible with a longitudinal dimension similar to the transverse dimension (plane XY). It should be remembered that, for an electrodynamic actuator, the Laplace force F is F=BLI where B is the magnetic field at the air gap E, L is the length of the coil winding and I is the intensity of the current flowing in the coil winding.

The arrangement of the electrodynamic actuator 100, 200 thus makes the best use of the length of the boring bar BF in order, in the constrained space of the bar, to be able to generate the higher forces.

From a practical point of view, however, it is still advantageous that the combined length of the two actuators 100, 200 remains less than or equal to 30% of the length of the boring bar BF. Indeed, it is advantageous that the actuators 100, 200 are located at the end of the boring bar BF intended to be close to the workpiece PU (place where the vibrations are generated). Therefore, if the cumulative length of the two actuators 100, 200 is too great, then their efficiency is reduced.

Furthermore, as can be seen in FIG. 2, it is interesting to place the actuator that is closest to the cutting tool OC with a direction of actuation DA merging with the radial vibration direction of the cutting tool. In fact, in machining, it is mainly the radial movements of the boring bar BF that cause machining defects. In the attached figures, this is the second actuator 200 (axis Y, radial direction). The first actuator 100 therefore has a direction of actuation that coincides with the tangential direction of vibration of the cutting tool OC (axis X). It is therefore more effective in counteracting vibrations to place the actuator whose direction of actuation coincides with the radial direction (axis Y) closest to the source of the vibrations.

that the actuator (200) located closest to a cutting tool (OC) of the boring bar (BF) has a direction of actuation (DA) coinciding with a radial direction of vibration of the cutting tool (OC).

Advantageously, the or each electrodynamic actuator 100, 200 comprises, on either side of the moving mass 110, 210, a plurality of springs juxtaposed along the direction of actuation of the actuator in question. This can be seen in FIGS. 4 to 7. A single spring on either side of the moving mass 110 may be sufficient to obtain the desired rigidity. However, a spring that is too thick may have difficulties in holding a high number of cycles (fatigue behaviour). Therefore, it may be interesting to reduce the thickness of the spring 120, 121, this thickness being defined along the direction X, to improve the fatigue behaviour. However, this results in a change in the stiffness of the spring 120, 121 along this same direction, which can on the other hand be corrected by using several springs, in particular identical ones, juxtaposed along this same direction X.

Advantageously also, the or each actuator 100, 200 comprises pads PG1, PG2, PG3, PG4 (PG'1, PG'3) inserted in the springs. The function of these pads is to provide additional stiffness to the springs in the direction of actuation of the actuator in question. This additional stiffness is of interest to ensure, for certain boring bars, that the natural frequency of the actuator 100, 200 corresponds to the fundamental frequency of the boring bar.

These pads may also provide assistance to the springs, to improve, if necessary, the guidance provided by the springs in the direction of actuation and this by providing stiffer pads in the directions perpendicular to the direction of actuation of the moving mass.

It will be noted that the wall P of the boring bar BF advantageously comprises, at the level of the or each actuator 100, 200, at least two removable covers C1, C2, substantially diametrically opposed, arranged opposite one of the springs mounted on the moving mass 101, 201. The presence of these covers C1, C2, allows to install, change or adjust the springs 120, 121, 220, 221.

It is also noted that the wall P of the boring bar BF is provided with a plurality of orifices O extending in the direction defined by the longitudinal axis Z of said boring bar. These orifices allow, in particular, the passage of various cables, for example the cables providing the electrical power supply for each electrodynamic actuator 100, 200.

Figure 10:
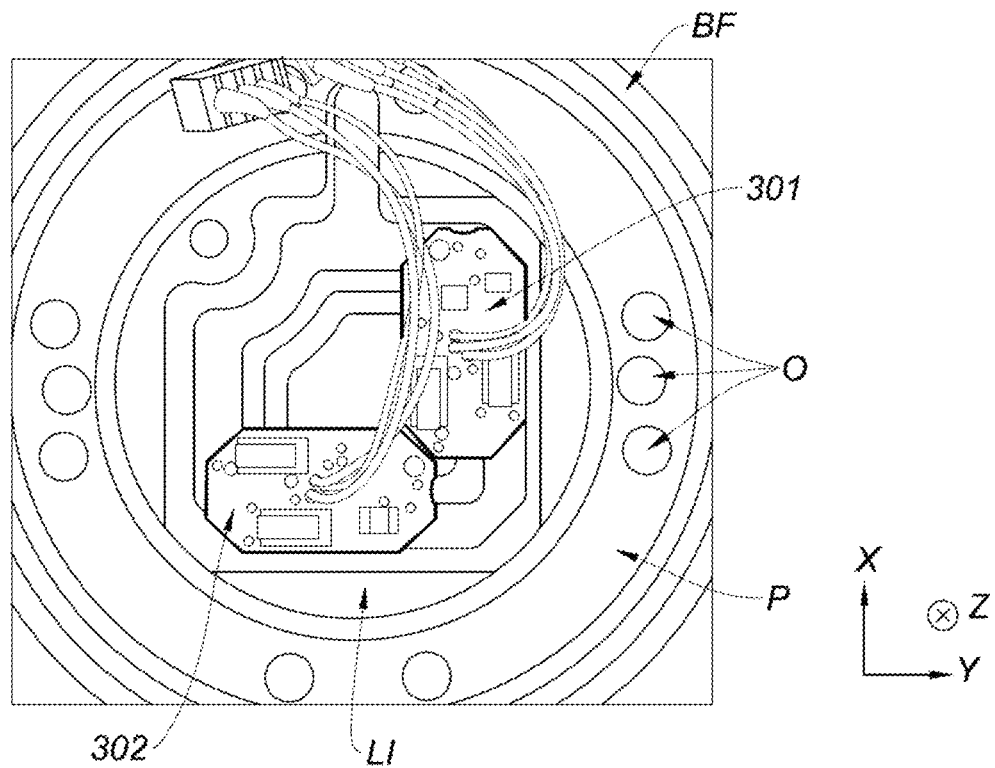
FIG. 10 shows sensors employed in the boring bar according to the invention.

As can be seen in FIG. 10, the boring bar BF may further comprise, in its inner recess LI, at least one vibration sensor 301 configured and arranged, within the boring bar BF, to detect vibrations in the XY plane.

For this purpose, a single multidirectional vibration sensor 301 may be provided, capable of measuring vibrations in at least both directions X and Y. In particular, this may be an accelerometer.

Alternatively, a first vibration sensor 301 configured and arranged, within the boring bar BF, to detect vibrations in the first direction X, and a second vibration sensor 302 configured and arranged, within the boring bar BF, to detect vibrations in the second direction Y may also be provided. Each sensor 301, 302 may then be an accelerometer, in particular, unidirectional. Advantageously, the two sensors 301, 302 are then in the same plane XY, a plane defined at a given dimension Z along the boring bar BF.

As shown schematically in FIG. 11, the invention also relates to a machine tool 400 comprising a boring bar BF in accordance with the invention, said boring bar BF further comprising, in its inner recess LI, at least one vibration sensor 301, 302 capable of sensing vibrations in a plane XY perpendicular to the longitudinal axis Z of the boring bar BF and at least one processor PRO configured to receive the data from said at least one vibration sensor 301, 302, to process them and to control the first actuator 100 and the second actuator 200 on the basis of the data thus processed. All that is implemented by the processor is known to the person skilled in the art and is therefore not detailed.

The invention claimed is:

1. A boring bar provided with a wall, an internal recess and a longitudinal axis, said boring bar comprising, in its internal recess:
  a first electrodynamic actuator comprising coil windings-surrounding a moving mass provided with at least one permanent magnet as well as, on either side of the moving mass, at least one spring mounted on the moving mass, the assembly being arranged to define a first direction of actuation perpendicular to the longitudinal axis of the boring bar;
  a second electrodynamic actuator provided with coil windings surrounding a moving mass having at least one permanent magnet as well as, on either side of the moving mass, at least one spring mounted on the moving mass, the assembly being arranged to define a second direction of actuation which is both perpendicular to the first direction of actuation and to the longitudinal axis of the boring bar.

2. The boring bar according to claim 1, wherein the first electrodynamic actuator and the second electrodynamic actuator are located one after the other along the longitudinal axis of the boring bar.

3. The boring bar according to claim 1, wherein, within the first electrodynamic actuator, the coil windings comprise a first coil winding and a second coil winding located opposite the first coil winding, in a first direction perpendicular to the longitudinal axis of the boring bar, and at least one of said at least one permanent magnet is arranged between two layers made of a soft magnetic material.

4. The boring bar according to claim 3, wherein, within the first electrodynamic actuator, the coil windings comprise a third coil winding, located opposite the second coil winding along said first direction, and the moving mass is provided with an additional permanent magnet arranged between two layers made of a soft magnetic material.

5. The boring bar according to claim 1, wherein, within the second electrodynamic actuator, the coil windings comprise a first coil winding and a second coil winding located opposite the first coil winding, according to a second direction both perpendicular to said first direction and to the longitudinal axis of the boring bar, and at least one of said at least one permanent magnet is arranged between two layers made of a soft magnetic material.

6. The boring bar according to claim 3, wherein, within the second actuator, the coil windings comprise a third coil winding located opposite the second coil winding in said second direction, and the moving mass is provided with an additional permanent magnet arranged between two layers made of a soft magnetic material.

7. The boring bar according to claim 1, wherein, for the first electrodynamic actuator and/or the second electrodynamic actuator, the moving mass and each coil winding has larger dimensions along the longitudinal axis of the boring bar than in a plane perpendicular to said longitudinal axis.

8. The boring bar according to claim 1, wherein each of the electrodynamic actuators comprises, on either side of the moving mass, said at least one spring comprises a plurality of springs juxtaposed along the direction of actuation of the actuator in question.

9. The boring bar according to claim 1, wherein the the first dynamic actuator comprises pads inserted in the at least one spring, and wherein the second electrodynamic actuator comprises pads inserted in said at least one spring.

10. The boring bar according to claim 1, wherein the wall comprises, at a level of each of the actuators, at least two removable covers, substantially diametrically opposed, arranged opposite one of the springs mounted on the moving mass.

11. The boring bar according to claim 1, wherein the wall is provided with a plurality of orifices extending in a direction defined by the longitudinal axis of the boring bar.

12. The boring bar according to claim 1, wherein the actuator located closest to a cutting tool of the boring bar has a direction of actuation coinciding with a radial direction of vibration of the cutting tool.

13. The boring bar according to claim 1, wherein a cumulative length, defined along the longitudinal axis of the boring bar, of the first actuator and the second actuator does not exceed 30% of a total length of the boring bar.

14. A machine tool comprising:
  a boring bar according to claim 1, said boring bar further comprising, in the internal recess, at least one vibration sensor able to sense vibrations in a plane perpendicular to the longitudinal axis of the boring bar, at least one processor configured to receive data from said at least one vibration sensor, process the data and control the first actuator and the second actuator based on the data processed.

15. The machine tool according to claim 1, wherein the boring bar comprises, in the internal recess:

a first vibration sensor configured and arranged, within the boring bar, to detect vibrations in said first direction, and a second vibration sensor configured and arranged, within the boring bar, to detect vibrations in said second direction.

* * * * *